(12) United States Patent
Geisow et al.

(10) Patent No.: US 8,248,342 B2
(45) Date of Patent: Aug. 21, 2012

(54) REFLECTIVE DISPLAY

(75) Inventors: Adrian Geisow, Portishead (GB); Stephen Kitson, Alveston (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 721 days.

(21) Appl. No.: 12/325,601

(22) Filed: Dec. 1, 2008

(65) Prior Publication Data
US 2009/0140961 A1 Jun. 4, 2009

(30) Foreign Application Priority Data
Nov. 30, 2007 (GB) .................................. 0723397.6

(51) Int. Cl.
*G09G 3/36* (2006.01)
(52) U.S. Cl. .......................................................... 345/88
(58) Field of Classification Search ........................ None
See application file for complete search history.

(56) References Cited

U.S. PATENT DOCUMENTS

| | | | | |
|---|---|---|---|---|
| 4,127,848 A * | 11/1978 | Shanks | | 345/87 |
| 4,581,608 A * | 4/1986 | Aftergut et al. | | 345/88 |
| 5,714,970 A * | 2/1998 | Bos et al. | | 345/88 |
| 6,285,422 B1 * | 9/2001 | Maeda et al. | | 349/96 |
| 6,300,929 B1 * | 10/2001 | Hisatake et al. | | 345/94 |
| 6,512,559 B1 | 1/2003 | Hashimoto et al. | | |
| 6,580,483 B2 * | 6/2003 | Suzuki et al. | | 349/115 |
| 6,690,348 B2 * | 2/2004 | Sato et al. | | 345/102 |
| 6,735,009 B2 * | 5/2004 | Li | | 359/245 |
| 7,190,417 B2 * | 3/2007 | Harada et al. | | 349/25 |
| 2001/0040542 A1 * | 11/2001 | Harada et al. | | 345/87 |
| 2003/0081304 A1 | 5/2003 | Harada et al. | | |
| 2006/0125750 A1 * | 6/2006 | Nose et al. | | 345/88 |
| 2006/0267890 A1 * | 11/2006 | Odake et al. | | 345/87 |
| 2006/0267891 A1 * | 11/2006 | Nishimura et al. | | 345/87 |

FOREIGN PATENT DOCUMENTS

| | | |
|---|---|---|
| JP | 8313899 A | 11/1996 |
| JP | 2000-258794 A | 9/2000 |

OTHER PUBLICATIONS

Machine translation of Kyozuka et al., JP 08-313899, published Nov. 29, 1996.*
Machine translation of Saito et al., JP 2000-258794, published Sep. 22, 2000.*
GB Search Report in co-related counterpart application No. GB 0723397.6, dated Mar. 25, 2008.

\* cited by examiner

*Primary Examiner* — Peter Vincent Agustin

(57) ABSTRACT

A reflective display device (2) comprises a plurality of controllable light absorption layers (8) arranged in a stack. Each of the layers (8) is capable of absorbing incident light in a specified wavelength band. A selective reflector (10) is immediately behind at least one of the layers (8) and is adapted to reflect at least some wavelengths of light within the wavelength band and substantially to transmit light of other wavelengths.

20 Claims, 5 Drawing Sheets

REFLECTIVE DISPLAY

The present invention relates to a reflective display, notably to a reflective full colour display.

A reflective display is a non-emissive device in which ambient light for viewing the displayed information is reflected from the display back to the viewer rather than light from behind the display being transmitted through the display. A problem with reflective displays is that light must pass through a number of layers twice, and unwanted absorption by those layers can reduce efficiency. This problem is increased if a stack of controllable layers is used to allow independent control of different colours.

SUMMARY OF THE INVENTION

Aspects of the invention are specified in the independent claims. Preferred features are specified in the dependent claims.

By putting a spectrally selective reflection layer immediately beneath a controllable absorption layer, any light in that spectral band not absorbed by the layer can be returned to the viewer without having to traverse any lower layers. This results in improved performance.

For example, if the top switchable layer controls absorption in the blue channel, a blue reflector can be placed immediately underneath. Red and green light will then continue to the lower layers, perhaps with red being modulated next. A red reflector could then be placed immediately underneath this layer, so that only green light would continue to the third layer, behind which either a broadband or a green reflector would be located.

With this arrangement, the lower controllable absorption layers need not be as spectrally selective; in the example given above, the second and third controllable absorption layers could also absorb blue light without affecting the performance of the device, as they are underneath the blue reflector. This might allow better colour performance by hiding the unwanted absorption in the other bands of the spectrum.

The order of the colour layers can be chosen for best optical effect—either to minimise the losses in the most sensitive part of the spectrum (if for example the electrodes are particularly absorbing in the blue, placing the blue layer at the top would be preferable), or to improve the colour performance of the display as described above.

The colour-selective layers can be made by a number of well-known methods, such as layers of curable cholesteric liquid crystal materials (two layers might be wanted to reflect both left and right hand polarizations of light) or Bragg reflective stacks. The reflector can be put immediately under the controllable absorption layer, before the incoming light has hit the second electrode for that layer, which gives the least loss for that part of the spectrum, at the cost of increasing the distance of the electrode from the controllable layer. Alternatively the reflector may be located anywhere between the layer whose spectrum it matches and the next controllable layer.

If a metal layer is part of the selective reflector layer, it may be possible to use that metal layer as the electrode for the neighbouring controllable layer, further simplifying the device and reducing unwanted losses.

It is not necessary to have three selectively reflecting layers—there may be benefit from just one under the top controllable layer and e.g. a broadband reflector at the bottom of the stack.

As it is desirable in many reflective displays to give a diffuse background, rather than for the display to have a specular appearance, it may be useful to perturb the reflective layers so that the light is slightly diffused, for example by spatially modulating the orientation of the reflector so that it is not quite coplanar with the display plane in a way that changes from region to region. The divergence from coplanarity with the display substrates may be quite small, for example ±2°, notably ±1°.

The invention provides a display which is brighter than one without a selective reflection layer.

Reflective layers can be made easily, for example by use of curable cholesteric materials such as those from Merck.

A further benefit of this invention arises with the use of dichroic dyed layers as the controllable absorption layers. To absorb both polarizations in their absorbing orientation, prior art has suggested using a quarter-wave plate behind the layer, in order to convert the unabsorbed polarization into one which on reflection will be absorbed during the return path through the layer. See for example, Wu & Yang, *Reflective Liquid Crystal Displays*, Wiley-SID 2001, 4.2 Cole-Kashnow Cell, 136-137. Normally it is difficult to make a waveplate that gives the correct phase shift across the whole visible spectrum. In the case of the present invention, individual waveplates can be placed in front of each Bragg mirror, and can be more easily made to have the correct phase shift over the narrower spectrum for that corresponding layer.

The terms "behind" and "beneath" are used herein with reference to the relationship between a controllable absorption layer and its corresponding selective reflector, to denote that the reflector is disposed to receive incident light after the light has passed through the absorption layer. The term "immediately" in this context means that light which passes through a controllable absorption layer impinges on the corresponding reflection layer without passing through any intermediate controllable absorption layer.

BRIEF DESCRIPTION OF THE DRAWINGS

The invention will now be further described, by way of example only, with reference to the following drawings in which.

DETAILED DESCRIPTION

Figure 1:
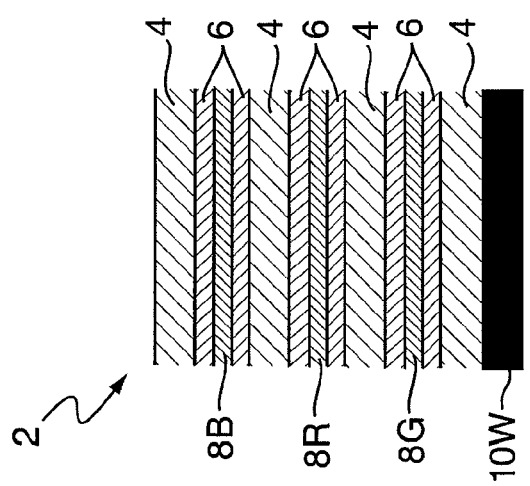
FIG. 1 is a schematic sectional view through a prior art reflective display device.

The prior art reflective display device 2 shown in FIG. 1 comprises a stack of selective absorption layers 8B, 8R and 8G, in this example liquid crystal layers 8, which can be made to absorb, respectively, blue, red and green light. The blue-absorbing layer 8B is at the top of the stack and the green-absorbing layer 8G is at the bottom of the stack.

Each absorption layer 8 is sandwiched between transparent substrates 4 and transparent conductors 6 and can be wholly or partly actuated by the application of suitable electric signals via the conductors 6. Thus selected pixel regions of each absorption layer 8 may be made either to absorb light in a particular wavelength band or substantially to transmit all incident light. A silver mirror 10W functions as a broadband reflector which reflects light of all wavelengths. The silver mirror 10W, is disposed at the bottom of the device 2 and reflects light back through the layers 4,6,8 to the viewer.

The light passes 12 times through conductor layers 6. Ignoring aperture issues, the best reflectivity will be determined by the loss in the conductors 6 and the reflectivity of the silver mirror 10W. Various translucent conductors 6 are known to those skilled in the art of display manufacture, for example indium tin oxide (ITO) or poly(3,4-ethylenedioxythiophene) poly(styrenesulfonate) (Pedot-PSS).

Given:
conductor transmission ~97.5%; and
silver reflectivity ~92%;
the expected peak reflectivity of $0.92 \times (0.975)^{12}$ is about 68%.

Figure 2:
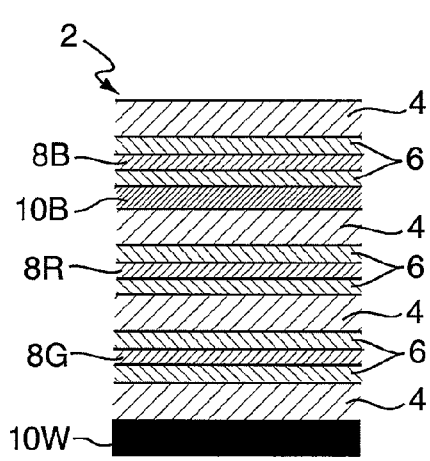
FIGS. 2-5 are schematic sectional views through embodiments of reflective display devices in accordance with an aspect of the present invention.

Turning now to FIG. 2, a reflective display device 2 in accordance with an aspect of the invention includes a wavelength selective mirror 10B between the conductor 6 below the blue-absorbing LC 8B and the substrate 4 immediately below the conductor 6. The device 2 shown in FIG. 3 includes a corresponding additional wavelength selective mirror 10R below the red-absorbing LC 8R, and the device 2 of FIG. 4 includes a further corresponding additional wavelength selective mirror 10G below the green-absorbing LC 8G. The mirrors 10R and 10G reflect red light and green light respectively. The device 2 of FIG. 5 is similar to the device of FIG. 4 but does not include the silver mirror 10W since in principle the three selective mirrors 10B, 10R and 10G should, between them, reflect substantially all of the non-absorbed incident light.

The wavelength selective mirrors could be made from reactive mesogen cholesteric films, for example Merck materials RMS03-008 (blue reflective), RMS03-010 (green) and RMS03-009 (red).

Model

Modelling of devices in accordance with aspects of the invention was carried out using the method described by D W Berreman: *Optics in stratified media: 4×4 matrix formulation*; Optical Society of America, 62(4):502-10, 1972.

In order to model the device 2 we need to have representative values for each layer.

We start by leaving out the LC 8 and setting $n_o$ & $n_e$ to 1.52. We use the same value for the substrate 4 and the conductor 6, and we assume that the incident medium has the same index rather than 1.0 This removes any reflective losses from the first interface. In practice we would add an anti-reflection coating to achieve almost the same.

We assume that the substrates 4 are 50 μm, and that the LC 8 is 3 μm thick.

We need values for the imaginary part of the refractive index for the conductor 6, and we need to design the mirrors 10.

We assume that the thickness of the conductor is 100 nm and model a layer surrounded by the same index (1.52) media. We then calculate the transmission and find the value of the imaginary part of the refractive index for the conductor that gives a transmission of 97.5% for a wavelength of ~550 nm. Modelling gives the value as −0.011.

Silver Mirror

We use data sheet values for silver:
n=0.27
k=−4.18
and assume a thickness of 200 nm.

The model gives a reflectivity of 92% (for light incident from a medium with n=1.52). The reflectivity does not vary much with wavelength.

Cholesteric Mirrors

The reflectivity of these mirrors 10B,10R,10G is determined by the refractive indices and the pitch. They only reflect one handedness of circularly polarised light. To reflect unpolarised light two layers with opposite twist are needed. We have assumed that each layer is 5 μm thick.

We set $n_o$=1.49, $n_e$=1.66—fairly typical parameters.

Figure 6:
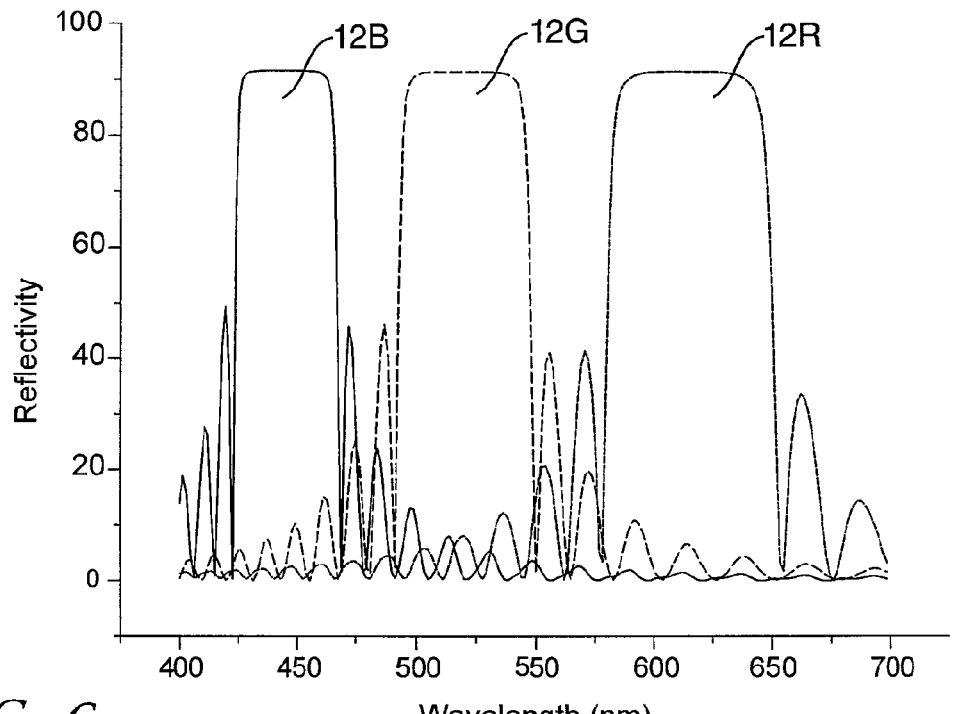
FIG. 6 is a graph of reflectivity v wavelength for model cholesteric mirrors suitable for use in embodiments of the invention.

One can tune the reflection band by varying the pitch. We have tuned the three mirrors as shown in FIG. 6, where reflectivity peaks 12B, 12G and 12R correspond respectively to reflection from the blue reflector 10B, green reflector 10G and red reflector 10R. The cholesteric pitch controls the central wavelength. We have used:

| | |
|---|---|
| Red | 0.39 μm |
| Green | 0.33 μm |
| Blue | 0.28 μm. |

Figure 7:
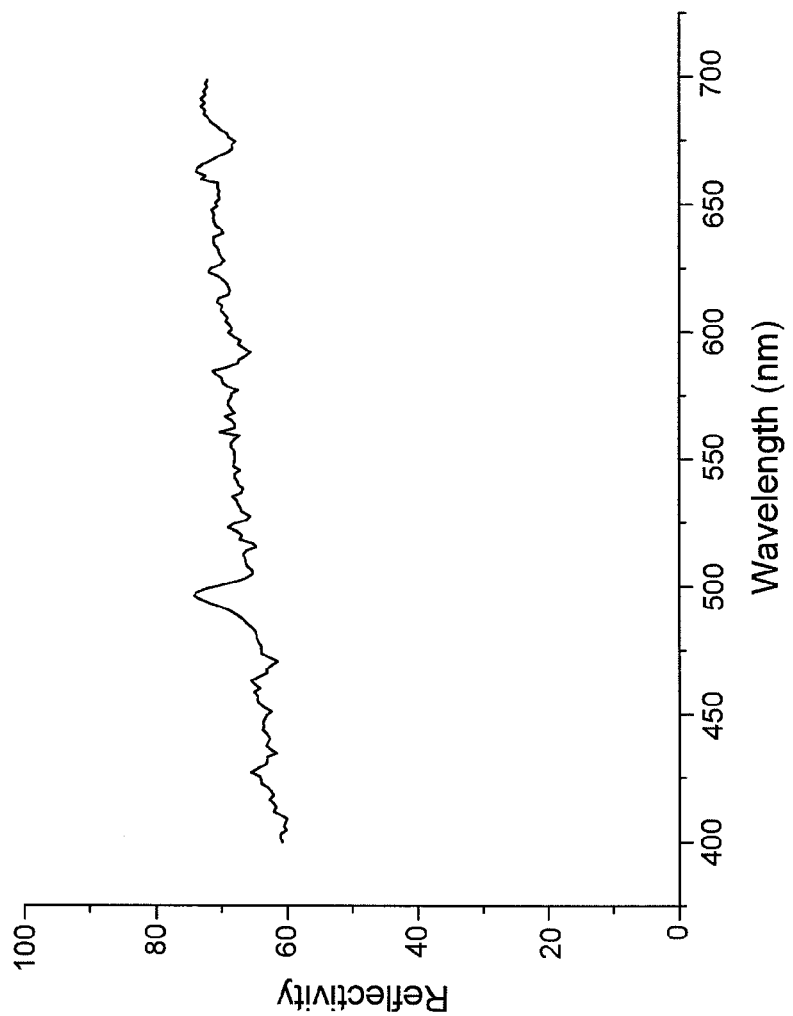
FIG. 7 is a graph of reflectivity v wavelength for the prior art reflective display device of FIG. 1.

Modelling of % reflectivity v wavelength for the prior art device of FIG. 1 gives the graph shown in FIG. 7. The reflectivity of about 68% is in line with expectation. (The oscillations are due to interference between the layers. The model assumes full coherence which amplifies these effects.)

Figure 3:
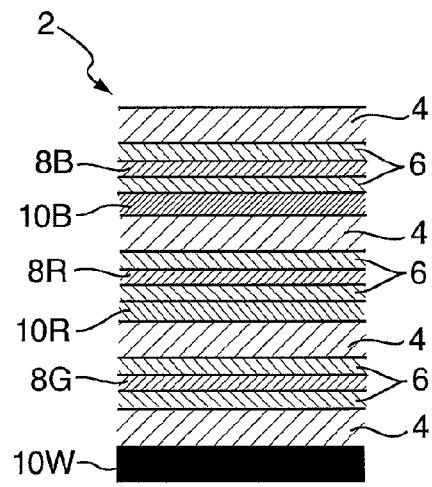
Figure 8:
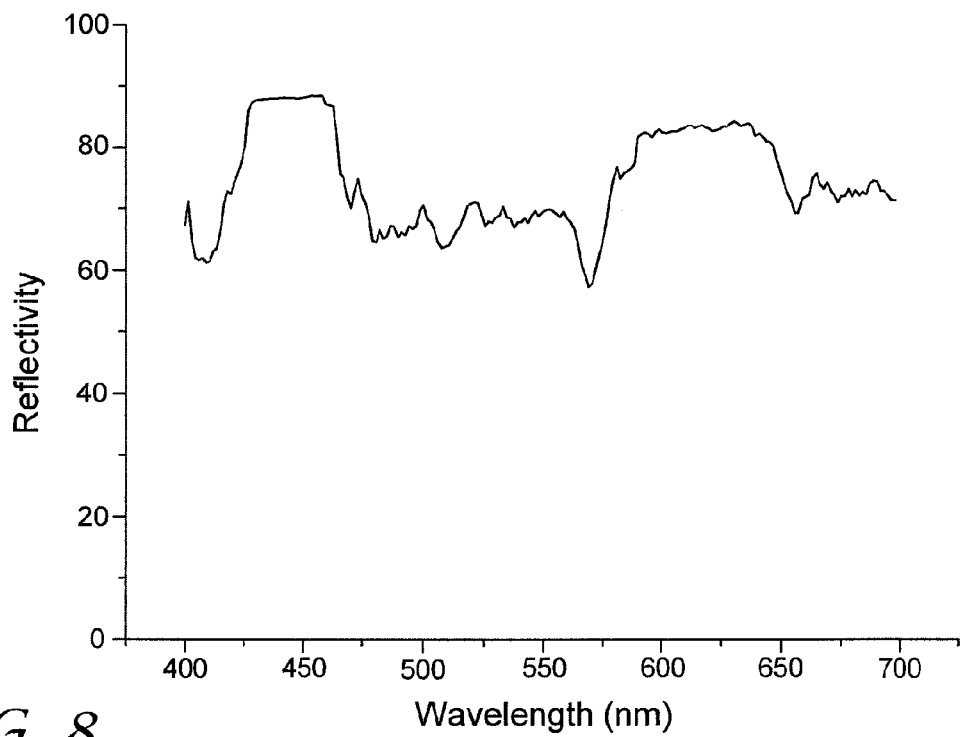
FIGS. 8-10 are graphs of reflectivity v wavelength for the model embodiments of FIGS. 3-5.

Modelling of % reflectivity v wavelength for the device of FIG. 3 (using blue and red mirrors 10B and 10R) is shown in FIG. 8. The model shows substantial enhancement of reflectivity where the cholesteric mirrors 10B, 10R have an effect. The enhancement is strongest for the first layer (in this example, blue). The order of the layers could of course be changed.

Figure 9:
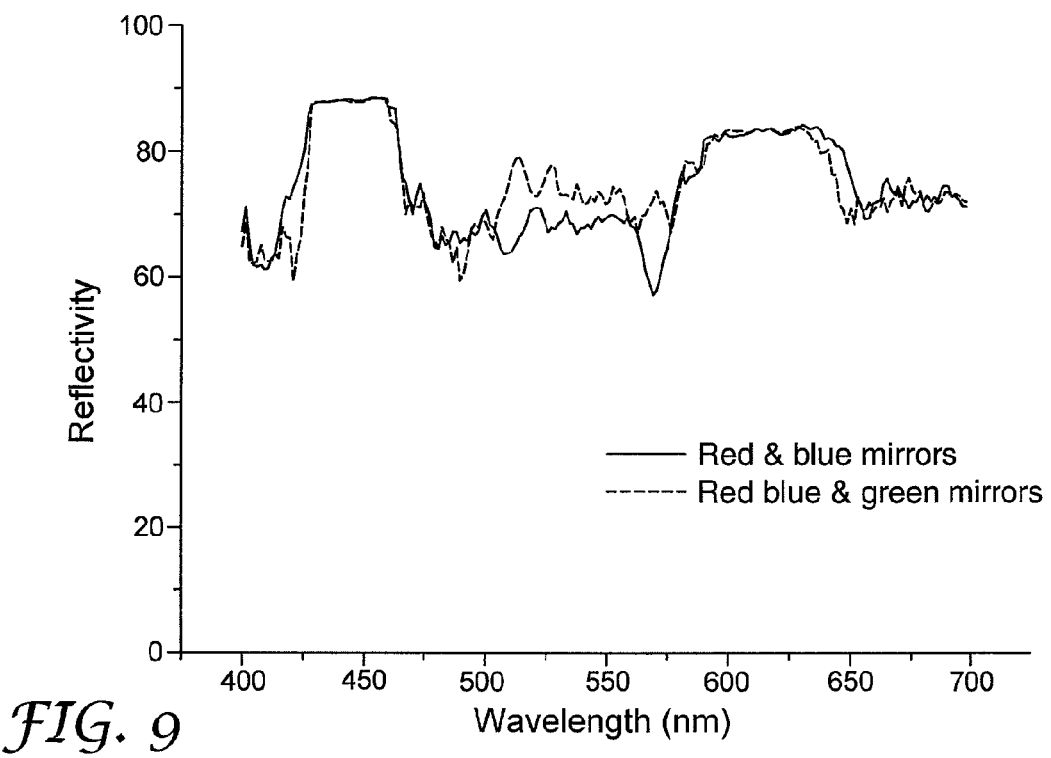

As shown in FIG. 9, adding a third selective reflector (in this example a green reflector 10G) has relatively little effect.

Figure 10:
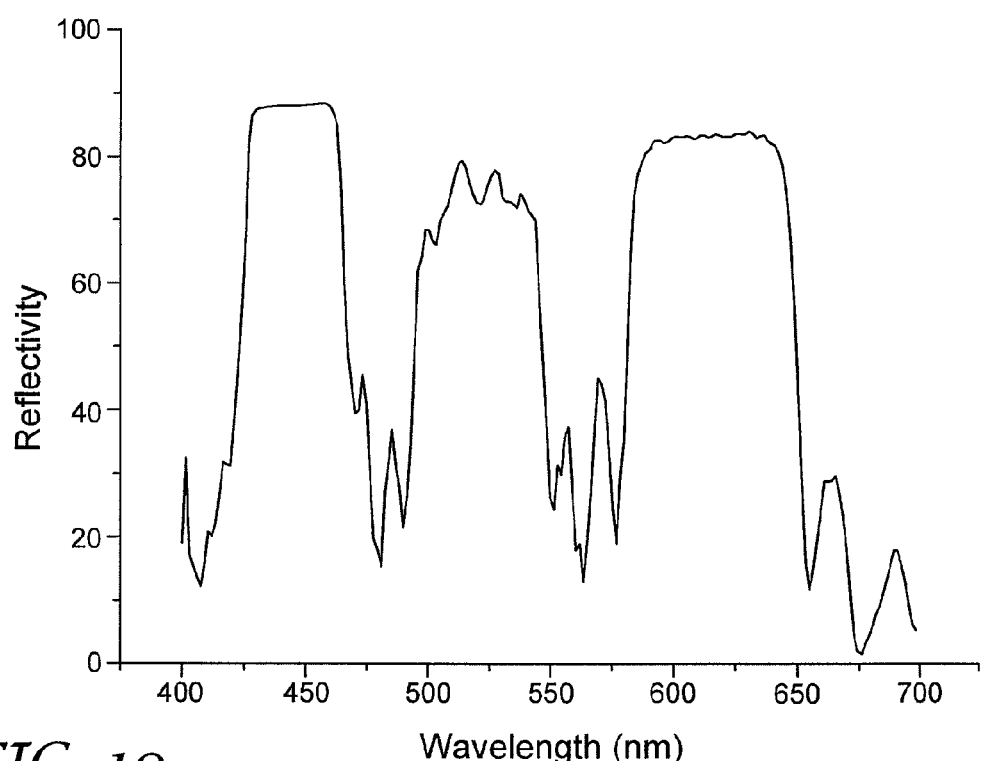

Modelled reflectivity for the device of FIG. 5 is shown in FIG. 10. Here, three selective reflectors are used without the silver mirror 10W. As expected, reflectivity is better than for the prior art device, although there may be some colour shifts with viewing angle.

Figure 4:
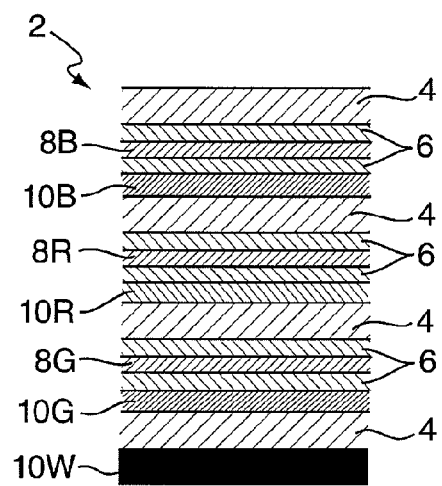
Figure 5:
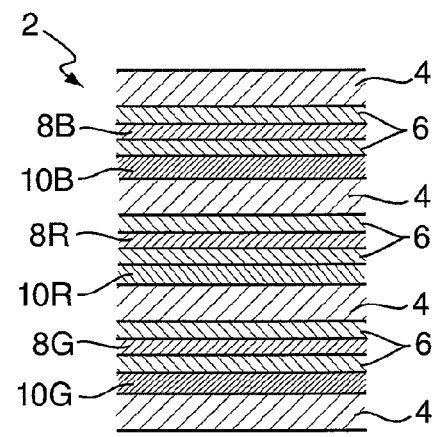
Figure 11:
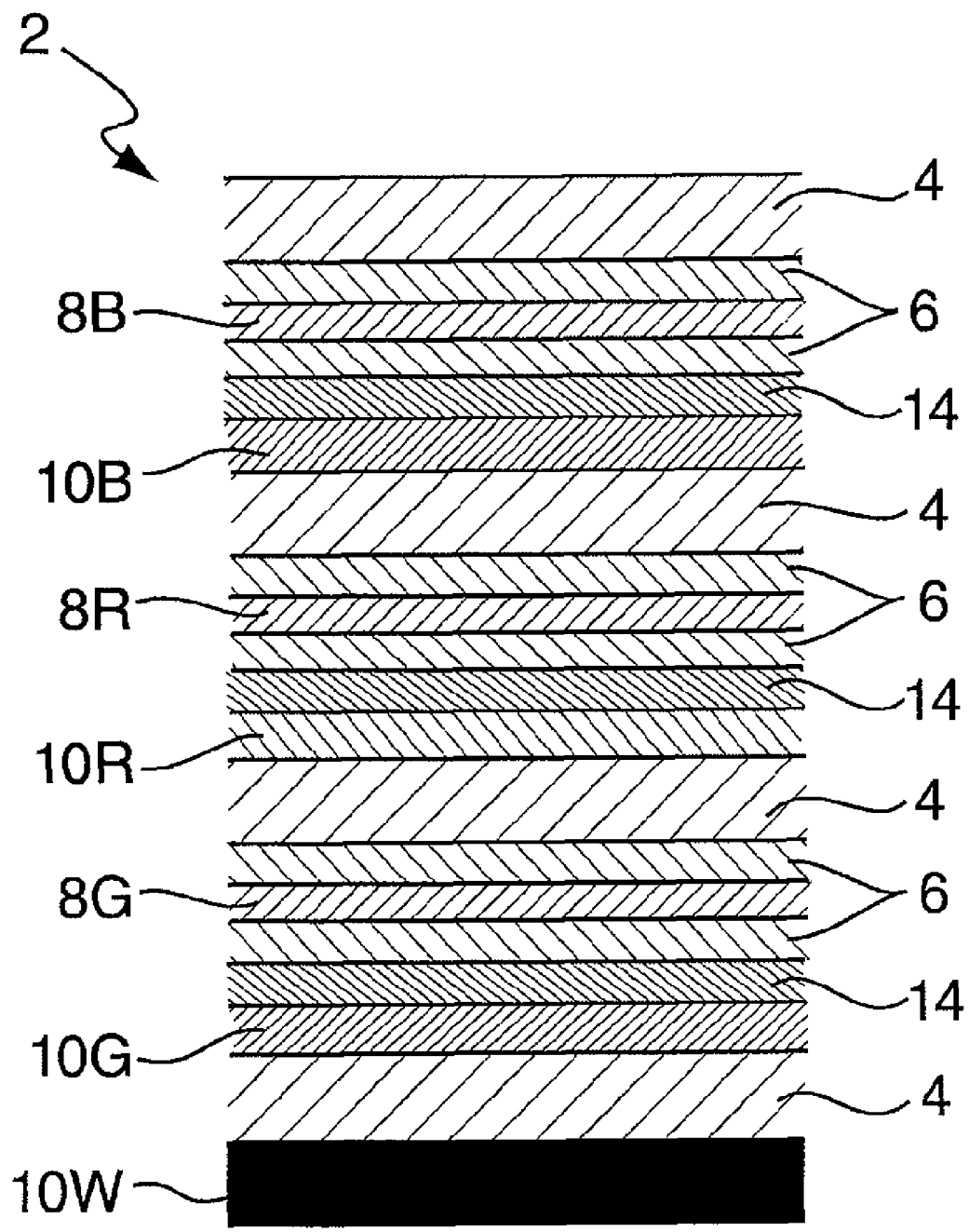
FIG. 11 is a schematic sectional view through a reflective display device in accordance with a further embodiment of the invention.

Turning now to FIG. 11, an embodiment is illustrated which is similar to FIG. 4 but in which a retarder 14 is disposed between each controllable absorption layer 8 and its corresponding Bragg selective reflector 10. The retarder 14 exhibits a quarter wave retardation. Where the controllable light absorption layer 8 is a dyed LC material with an untwisted configuration, the layer 8 will typically absorb light of one polarisation while transmitting light of opposite polarity. By passing the plane polarised light through a retarder 14 the light may be circularly polarised. On reflection from the Bragg reflector 10, the polarisation of the light is inverted and after passing back through the retarder 14 it has a polarisation opposite to its original state, i.e. of a polarity to be absorbed by the dyed LC material 8. This arrangement improves absorption efficiency.

The retarder 14 may comprise a single quarter-wave plate or it may comprise a combination of two, three or more waveplates, for example a quarter-wave plate and a half-wave plate in combination. Such combinations may broaden the wavelength range and are known per se. For example, U.S. Pat. No. 7,169,447 describes a combination of half-wave and quarter-wave plates made from polymerised liquid crystals. P Harihan, in "Broad-band superchromatic retarders", Meas. Sci. Technol. Vol. 9 (1998) 1678-1682 describes a combination of four plates.

Despite technological advances, it is difficult to produce a retarder which works to the same efficiency across the whole visible spectrum. Accordingly, by providing one or more selective reflectors 10, an associated retarder 14 need work only over the limited waveband range of the reflector 10. Each retarder 14 may be selected or tuned for optimal performance with its associated reflector 10, thereby improving performance of the device.

It will be understood that, for purposes of illustration, the various layers shown in FIGS. 1-5 and 11 have been drawn not necessarily to scale.

The articles, 'a' and 'an' are used herein to denote 'at least one' unless the context otherwise dictates.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the ambit of the present invention as specified in the claims.

What is claimed is:

1. A reflective display device comprising:
   a plurality of controllable light absorption layers arranged in a stack, said layers being capable of absorbing incident light in respective wavelength bands, wherein each of the controllable light absorption layers has a first electrode at a first surface of the layer and a second electrode at a second surface of the layer; and
   a selective reflector behind a first of said layers and in front of a second of said layers in the stack, the selective reflector being adapted to reflect at least some wavelengths of light within the wavelength band of the first layer and to transmit light of wavelengths within the wavelength band of the second layer.

2. A device according to claim 1, wherein the plurality of controllable light absorption layers comprises three controllable light absorption layers.

3. A device according to claim 2, wherein said three light absorption layers comprise a red light absorption layer, a green light absorption layer and a blue light absorption layer.

4. A device according to claim 1, further comprising a broadband light reflector disposed behind the controllable absorption layer at the bottom of the stack.

5. A device according to claim 2, wherein the two controllable absorption layers at the top of the stack and in the middle of the stack each have a corresponding selective reflector disposed immediately behind it; the device further comprising a broadband light reflector disposed behind the controllable absorption layer at the bottom of the stack.

6. A device according to claim 2, wherein each of the controllable absorption layers has a corresponding selective reflector disposed immediately behind it.

7. A device according to claim 6, further comprising a broadband light reflector disposed behind the selective reflector at the bottom of the stack.

8. A device according to claim 1, wherein the controllable absorption layer at the top of the stack is capable of absorbing blue light.

9. A device according to claim 1, wherein each controllable light absorption layer is disposed between a pair of electrode layers, and wherein the or each selective reflector is disposed between the light absorption layer and one of said electrode layers.

10. A device according to claim 1, wherein the or each selective reflector comprises a polymerized cholesteric material or a Bragg reflective stack.

11. A device according to claim 10, wherein the or each selective reflector includes a semi-transparent metal which functions as an electrode for an adjacent one of said controllable light absorption layer.

12. A device according to claim 1, wherein the or each selective reflector comprises two layers of a polymeric cholesteric material, one of which reflects left circularly polarized light and the other of which reflects right circularly polarized light.

13. A device according to claim 1, wherein each controllable absorption layer comprises a liquid crystal material having a dichroic dye dissolved therein.

14. A device according to claim 13, wherein a retarder is disposed between the or each selective reflector and its corresponding controllable light absorption layer.

15. A reflective display device comprising:
    a plurality of controllable light absorption layers arranged in a stack, said layers being capable of absorbing incident light in respective wavelength bands;
    a Bragg selective reflector behind at least one of said layers, the Bragg selective reflector being adapted to reflect at least some wavelengths of light within the wavelength band of one of said layers in front of the Bragg selective reflector and substantially to transmit light of other wavelengths; and
    a quarter-wave retarder disposed between said at least one layer and said Bragg reflector.

16. A reflective display device as claimed in claim 15 further comprising a half-wave retarder disposed between said at least one layer and said Bragg reflector.

17. A reflective display device comprising:
    a controllable red light absorption layer, a controllable green light absorption layer and a controllable blue light absorption layer arranged in a stack, wherein each of the controllable light absorption layers has a first electrode at a first surface of the layer and a second electrode at a second surface of the layer; and
    a selective reflector immediately behind at least one of said layers, the selective reflector being adapted to reflect at least some wavelengths of light which said layer is capable of absorbing and substantially to transmit light of wavelengths which said layer is not capable of absorbing.

18. A device according to claim 17, wherein said selective reflector is a polymeric cholesteric film or a Bragg reflector.

19. A device according to claim 17, wherein each of said controllable light absorption layers comprises a liquid crystal material having a dichroic dye dissolved therein, the device further comprising an electrode on each side of each liquid crystal layer for selectively applying an electric field across selected pixel areas of said liquid crystal layer.

20. A device according to claim 19, wherein at least one of said electrodes is part of one of said selective reflectors.

* * * * *